US 8,082,339 B2

(12) United States Patent
Rao

(10) Patent No.: US 8,082,339 B2
(45) Date of Patent: Dec. 20, 2011

(54) ELECTRONIC DEVICE NETWORK HAVING GRACEFUL DENIAL OF SERVICE

(75) Inventor: Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2741 days.

(21) Appl. No.: 10/782,083

(22) Filed: Feb. 19, 2004

(65) Prior Publication Data
US 2004/0177353 A1 Sep. 9, 2004

Related U.S. Application Data

(60) Provisional application No. 60/450,868, filed on Feb. 28, 2003.

(51) Int. Cl.
*G06F 15/173* (2006.01)
(52) U.S. Cl. ........ 709/224; 709/205; 709/216; 709/219; 709/225; 709/229; 717/168; 717/169
(58) Field of Classification Search .................. 709/203, 709/219, 221, 229, 248, 250, 216, 225, 224; 717/168; 707/2; 726/2, 27
See application file for complete search history.

(56) References Cited

U.S. PATENT DOCUMENTS

| | | | |
|---|---|---|---|
| 5,261,055 A | 11/1993 | Moran et al. | 395/275 |
| 5,442,771 A | 8/1995 | Filepp et al. | 395/650 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,666,364 A * | 9/1997 | Pierce et al. | 370/455 |
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |
| 5,878,256 A | 3/1999 | Bealkowski et al. | 395/652 |
| 5,909,581 A * | 6/1999 | Park | 717/170 |
| 5,960,445 A | 9/1999 | Tamori et al. | 707/203 |

(Continued)

FOREIGN PATENT DOCUMENTS
CA 2339923 3/2000
(Continued)

OTHER PUBLICATIONS

"Focus on OpenView A guide to Hewlett-Packard's Network and Systems Management Platform", Nathan J. Muller, pp. 1-291. CBM Books, published 1995.

(Continued)

*Primary Examiner* — Michael Won

(57) ABSTRACT

Disclosed herein is an electronic device network adapted to provide graceful management and graceful denial of service when incoming service requests are unable to be processed immediately. When an attempt is made to process an incoming request, upon determining that all device servers are busy, unavailable, or overloaded, the incoming request may be rescheduled. Thereafter, an appropriate message(s) and alternate request schedule(s) may be communicated to the electronic device. Upon determining that one of the device servers is available to manage an incoming request, the request may be handed over to the device server for processing and delivery. A request that has been denied service/access and rescheduled may be gracefully managed by recognizing that the request has been rescheduled and processing the rescheduled request with higher priority.

43 Claims, 4 Drawing Sheets

U.S. PATENT DOCUMENTS

| | | | | |
|---|---|---|---|---|
| 5,987,506 | A * | 11/1999 | Carter et al. | 709/213 |
| 5,999,740 | A * | 12/1999 | Rowley | 717/173 |
| 6,009,497 | A | 12/1999 | Wells et al. | 711/103 |
| 6,038,636 | A | 3/2000 | Brown, III et al. | 711/103 |
| 6,064,814 | A | 5/2000 | Capriles et al. | 395/701 |
| 6,073,206 | A | 6/2000 | Piwonka et al. | 711/102 |
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,230,190 | B1 * | 5/2001 | Edmonds et al. | 709/213 |
| 6,266,513 | B1 * | 7/2001 | Briancon | 340/7.22 |
| 6,279,153 | B1 | 8/2001 | Bi et al. | 717/11 |
| 6,311,322 | B1 | 10/2001 | Ikeda et al. | 717/1 |
| 6,381,456 | B1 * | 4/2002 | Ko | 455/435.1 |
| 6,412,079 | B1 * | 6/2002 | Edmonds et al. | 714/11 |
| 6,438,585 | B2 | 8/2002 | Mousseau et al. | 709/206 |
| 6,625,641 | B1 * | 9/2003 | Hare et al. | 709/203 |
| 6,725,268 | B1 * | 4/2004 | Jackel et al. | 709/227 |
| 6,754,714 | B1 * | 6/2004 | Chebrolu | 709/229 |
| 6,789,255 | B1 * | 9/2004 | Pedrizetti et al. | 717/169 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2003/0112752 | A1 * | 6/2003 | Irifune et al. | 370/229 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press. 1998.

"Any Network, Any Terminal, Anywhere", A. Fasbender et al, IEEE Personal Communications, Apr. 1999, pp. 22-30, IEEE Press, 1999.

* cited by examiner

ELECTRONIC DEVICE NETWORK HAVING GRACEFUL DENIAL OF SERVICE

CROSS-REFERENCE TO OTHER APPLICATIONS

The present application claims the benefit of priority of U.S. Provisional Patent Application having Ser. No. 60/450,868, filed Feb. 28, 2003, and Hereby incorporates herein by reference the complete subject matter thereof, in its entirety.

The present application also hereby incorporates herein by reference the complete subject matter of U.S. Provisional Patent Application having Ser. No. 60/373,422, filed Apr. 12, 2002, in its entirety.

The present application also hereby incorporates herein by reference the complete subject matter of PCT Application having publication number WO 02/41147 A1,and having application number PCT/US01/44034, filed Nov. 19, 2001, in its entirety.

The present application also hereby incorporates herein by reference the complete subject matter of U.S. Provisional Patent Application having Ser. No. 60/249,606, filed Nov. 17, 2000, in its entirety.

FEDERALLY SPONSORED RESHEARCH OR DEVELOPMENT

[Not Applicable]

MICROFICHE/COPYRIGHT REFERENCE

[Not Applicable]

BACKGROUND OF THE INVENTION

Electronic devices (i.e., mobile electronic devices having software/firmware), for example, mobile cellular phones, personal digital assistants (PDA's), pagers, MP3 players, digital cameras, etc. often contain firmware and/or application software that are either provided by the manufacturers of the electronic devices, telecommunication carriers, or third parties. These firmware and application software often contain bugs. New versions (updates) of the firmware and software are periodically made available to fix the bugs, introduce new features, delete features, etc.

Electronic networks adapted to communicate with electronic devices may be busy, unavailable, or overloaded, and therefore preventing and delaying communication between the electronic devices and the electronic network. End-users may become aggravated and dissatisfied when the electronic device is unable to communicate with the electronic network. The end-user may switch to a different service provider or a different electronic device.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspect of the present invention may be found in a method of gracefully managing incoming access requests during an update event from a plurality of electronic devices in a communication network. Each of the incoming access requests may comprise at least one update-related parameter. The method may also comprise receiving each incoming access request at least temporarily, monitoring and evaluating the incoming access requests using the at least one update-related parameter, determining the availability of at least one device server to process the incoming access requests, based upon the at least one update-related parameter, immediately processing incoming access requests upon determining that the at least one device server is available, and communicating at least one message to electronic devices requesting access upon determining that the at least one device server is unavailable.

In an embodiment according to the present invention, communicating may comprise determining at least one alternate schedule for the electronic device to send a rescheduled access request upon determining that the at least one device server is unavailable for processing, based upon the at least one update-related parameter.

In an embodiment according to the present invention, the at least one update-related parameter may comprise at least one of device identification information, firmware identification information, software identification information, and information regarding other resources available in the electronic device.

In an embodiment according to the present invention, the at least one message may comprise a denial of service message.

In an embodiment according to the present invention, the denial of service message may comprise at least one reason for service denial.

In an embodiment according to the present invention, determining the availability of the at least one device server to process the incoming access requests comprises evaluating at least one of an expected volume of requests, collected statistical information, user profile, request profile, and heuristics.

In an embodiment according to the present invention, the method may further comprise graceful communication termination. Graceful communication termination may comprise communicating an alternate schedule to send a rescheduled access request along with an explanatory denial of service message.

In an embodiment according to the present invention, monitoring and evaluating the incoming access requests may further comprise periodically retrieving a status information communication from one of the at least one device server and at least one of the plurality of electronic devices.

In an embodiment according to the present invention, monitoring and evaluating the incoming access requests may further comprise monitoring at least one network resource, operational status of the at least one device server, and volume of incoming access requests, and information regarding at least one of the plurality of electronic devices.

In an embodiment according to the present invention, the method may further comprise selecting a candidate device server to process an incoming access request based upon monitored information regarding the at least one device server.

In an embodiment according to the present invention, the at least one electronic device may comprise a plurality of mobile electronic devices. The plurality of mobile electronic devices may comprise at least one of a mobile cellular phone handset, personal digital assistant, pager, MP3 player, and a digital camera.

In an embodiment according to the present invention, the at least one message may comprise alternate schedule information. The alternate schedule information may comprise at least one of a time to re-submit an access request, a particularly time frame for re-submitting an access request, an amount of time that must elapse before re-submitting and access request, and a particular date for re-submitting an access request.

Aspects of the present invention may be found in a method of gracefully managing incoming access requests during an update event from a plurality of electronic devices in a mobile electronic network. The method may comprise evaluating the incoming access requests. The incoming access requests may at least comprise electronic device information. The method may also comprise recognizing that an incoming access request is a rescheduled access request and fulfilling the rescheduled access request with higher priority than an original request.

In an embodiment according to the present invention, the rescheduled access request may be an incoming access request that was previously denied.

In an embodiment according to the present invention, fulfilling the rescheduled access request with higher priority than an original request may comprise advancing the rescheduled request in a processing queue.

In an embodiment according to the present invention, fulfilling the rescheduled access request with higher priority than an original request may comprise immediately placing the rescheduled request in the processing queue.

In an embodiment according to the present invention, the at least one mobile electronic device may comprise a plurality of electronic devices. The plurality of electronic devices may comprise at least one of a mobile cellular phone handset, personal digital assistant, pager, MP3 player, and a digital camera.

Aspects of the present invention may be found in an electronic device network adapted to gracefully manage incoming access requests during an update event. Each of the incoming access requests may comprise at least one update-related parameter. The electric device network may also comprise at least one mobile electronic device having one of software and firmware. The mobile electronic device may be adapted to be communicatively coupled to the electronic device network. The electronic device network may also comprise an access control unit, at least one device server operatively coupled to the access control unit, and a memory operatively coupled to the at least one device server. The access control unit may be adapted to immediately process and manage incoming information access requests from the at least one electronic device.

In an embodiment according to the present invention, the at least one mobile electronic device may comprise a plurality of electronic devices. The plurality of electronic devices may comprise at least one of a mobile cellular phone handset, personal digital assistant, pager, MP3 player, and a digital camera.

In an embodiment according to the present invention, the at least one device server may comprise a plurality of device servers adapted to dispense updates to a plurality of update requesting electronic devices.

In an embodiment according to the present invention, the access control unit may be adapted to determine an incoming access request volume at the at least one device server and ability of the at least one device server to service additional incoming access requests.

In an embodiment according to the present invention, the network may also comprise a monitoring unit adapted to monitor activity of the at least one device server.

In an embodiment according to the present invention, the memory may further comprise a plurality of updates retrievable by the at least one device server.

In an embodiment according to the present invention, the at least one mobile electronic device may comprise random access memory and non-volatile memory. The non-volatile memory may comprise at least one of an update application loader, update agent, download agent, and an operating system.

In an embodiment according to the present invention, an incoming access request may comprise at least one of device identification information, firmware identification information, software version information, and resource availability information.

In an embodiment according to the present invention, the access control unit may be adapted to determine priority of an incoming access request by recognizing that the incoming access request is one of a repeated and rescheduled access request.

In an embodiment according to the present invention, the access control unit may be adapted to determine one of whether a particular incoming access request requires immediate processing, whether the incoming access request requires deferment, and whether the incoming access request requires denial based upon operational status information gathered by monitoring the at least one device server and by evaluating the incoming access request.

In an embodiment according to the present invention, upon determining that the incoming access request requires denial, the access control unit may communicate at least one message to the mobile electronic device.

In an embodiment according to the present invention, the at least one message to the mobile electronic device may comprise a denial of service message.

In an embodiment according to the present invention, the at least one message to the mobile electronic device may comprise at least one reason for service denial.

In an embodiment according to the present invention, upon determining that the incoming access request requires denial, the access control unit may be adapted to determine at least one alternate schedule for the mobile electronic device to send a rescheduled access request.

In an embodiment according to the present invention, upon determining that the incoming access request requires denial, the access control unit may be adapted to communicate at least one alternate schedule to the mobile electronic device along with the at least one message.

In an embodiment according to the present invention, a rescheduled access request may be an incoming access request that was previously denied service. The rescheduled access request may be determined to have higher priority than an original incoming access request. The rescheduled access request may be one of immediately placed in the processing queue and advanced in the processing queue.

In an embodiment according to the present invention, a rescheduled request may be rapidly advanced in the processing queue.

In an embodiment according to the present invention, upon determining that the incoming access request requires denial, a denial of service message may be displayed at the mobile electronic device.

In an embodiment according to the present invention, upon determining that the incoming access request requires denial, a message comprising instructions for re-attempting the denied access request at one of a specific time and after a period of time has elapsed and an explanatory message may be displayed at the mobile electronic device.

In an embodiment according to the present invention, the access control unit may be adapted to at least briefly accept all incoming communications.

In an embodiment according to the present invention, the electronic device network may further comprise a monitoring unit. The monitoring unit may be adapted to gracefully manage denial of service for incoming access requests by monitoring a volume of incoming access requests, determining device server availability, providing monitored information to the access control unit, determining alternative schedules for mobile electronic devices to re-attempt access requests, and communicating the alternative schedules to the mobile electronic devices.

In an embodiment according to the present invention, the mobile electronic devices may be adapted to one of repeat denied access requests without end-user intervention, prompt an end-user to initiate repeated access requests, display alternative schedules communicated to the mobile electronic device, prompt the end-user to select a particular alternative schedule, and autonomously repeat the access request according to a selected alternative schedule.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

DETAILED DESCRIPTION OF THE INVENTION

Electronic devices may be adapted to access servers to retrieve updates for updating at least one of firmware and software. An electronic device may be, for example, a mobile electronic device having software/firmware, such as, mobile cellular phone handsets, personal digital assistants (PDA's), pagers, MP3 players, digital cameras, etc. An update may comprise firmware and software updates that modify or change the version of a particular firmware or software installed in the device, for example, upgrading to a newer version, repairing a bug in the software, etc. An update may also add new services to the electronic device or delete services, as desired by a service provider, device manufacturer, or an end-user.

When an update is launched, (i.e., an update is made available for download to the applicable electronic devices), vast numbers of electronic devices may simultaneously attempt to access the servers where the update is located. The network may be provided with an intermediary device adapted to at least temporarily communicate with an access requesting electronic device and to transmit a message to the electronic device regarding the operational status of the network's device servers. Some of the electronic devices may not be able to connect to the servers as a result of server communication pathways being overwhelmed, but would be able to at least temporarily communicate with the intermediary device.

When service/access is denied to an end-user/electronic device, the end-user/electronic device may repeatedly attempt to connect with the servers, thus exacerbating the problem by propagating the overwhelming access request event. An end-user/electronic device denied service/access may be left with no other alternative than to continue to attempt to access the servers until connection is made.

An electronic device requesting access may transmit an access request to the network using a first type of communication and the network may respond using the same type of communication. Alternatively, the electronic device may transmit an access request to the network using a first type of communication and the network may respond using a different type of communication. For example, the electronic device may transmit a request to the network using a short message service (SMS) and the network may respond to the request using a circuit switched or packet switched communication service, or the reverse may occur.

Figure 1:
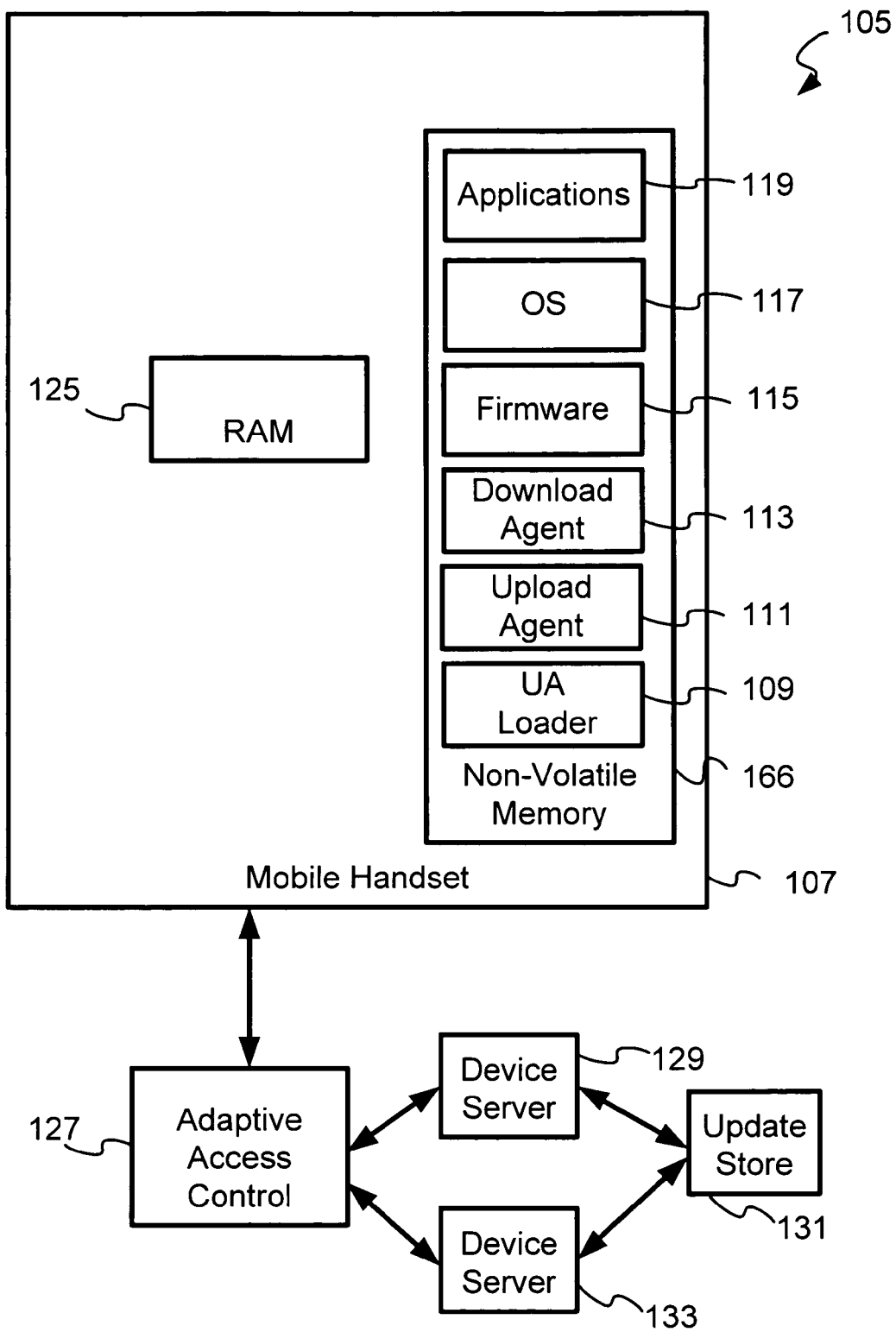
FIG. 1 is a block diagram of an electronic device network according to an embodiment of the present invention.

FIG. 1 is a block diagram of an electronic device network 105 according to an embodiment of the present invention. FIG. 1 illustrates an electronic device network 105 adapted to gracefully deny service to a plurality of electronic devices, for example, mobile handset 107, communicatively coupled to one of a plurality of device servers (for example, device servers 129 and 133) through an adaptive access control 127. The plurality of device servers may comprise at least two device servers (129, 133) adapted to dispense updates to a plurality of update requesting electronic devices, such as for example, mobile handset 107.

The electronic devices may be adapted to download updates from the at least two device servers (129, 133) of the electronic device network 105. The electronic device network 105 and the at least two device servers (129, 133) may receive requests for updates from the electronic devices, for example, mobile handset 107. The adaptive access control 127 may determine the load (such as for example, the volume of access requests and the volume of update transfers) on the plurality of device servers, and may determine the ability of the device servers to manage additional incoming connection requests.

Figure 2:
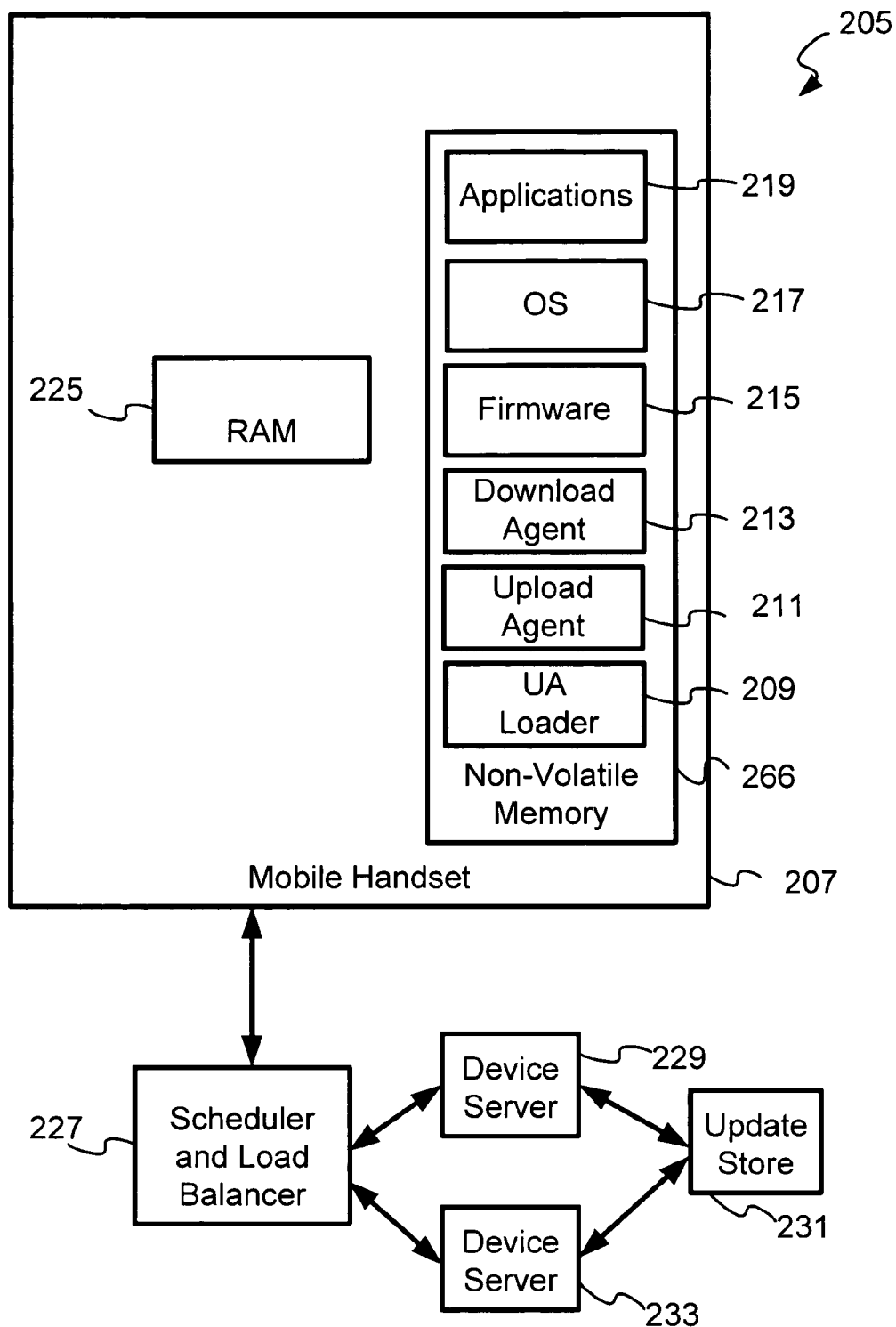
FIG. 2 is a block diagram of an electronic device network according to an embodiment of the present invention.

These determinations may comprise evaluating monitoring information available from a scheduler and load manager 227, as illustrated in FIG. 2 below for example. An update store 131 in the electronic device network 105 may comprise a repository/memory devices for storing a plurality of updates retrievable by the plurality of device servers, and subsequently retrievable by the requesting electronic devices.

The electronic devices associated with electronic device network 105, for example mobile handset 107, may comprise both random access memory (RAM) 125 and non-volatile memory 166. The non-volatile memory 166 may comprise a plurality of components, such as for example, update application loader (UA loader) 109, update agent 111, download agent 113, firmware 115, operating system (OS) 117, and applications 119. The update agent 111 may be a device or software application that is adapted to update the firmware 115, operating system 117, and/or other applications 119, etc., in the electronic device, for example, mobile handset 107.

The electronic devices, for example, mobile handset 107, may communicate with the plurality of device servers, for example, device servers 129 and 133, via the adaptive access control 127, to retrieve updates. The electronic devices may also be adapted to send requests for updates to the electronic device network 105. The requests may comprise a plurality of parameters, e.g., device identification information, firmware and software identification information, and information regarding other resources available in the electronic device, for example, mobile handset 107. The parameters may facilitate update of the electronic device firmware and software.

According to an embodiment of the present invention, the adaptive access control 127 may determine the load (for example, the volume) of requests being managed by the plurality of device servers, for example, device server 129 and 133, and may determine the ability of each of the plurality of device servers to manage additional incoming access requests. In such an embodiment, determining may comprise evaluating monitored information available from a scheduler and load manager 227, as illustrated in FIG. 2 below.

The adaptive access control 127 may also be adapted to determine the urgency or priority of an incoming access request. The incoming access request may comprise a request for firmware/software update, version update, data, or other information. The adaptive access control 127 may determine whether a particular incoming request is able to be fulfilled immediately, or whether the request must be deferred or temporarily denied, based upon information gathered (for example, monitored information available from a scheduler and load manager 227, as illustrated in FIG. 2 below for example) regarding the current availability and operational status of each of the plurality of device servers.

Upon determining that an incoming access request must be temporarily denied, the adaptive access control 127 may communicate an appropriate message to the end-user/electronic device. For example, a denial of service message may be displayed at the electronic device. The denial of service message may comprise an explanation of the request processing denial and/or may comprise instructions for the end-user to try again at some later scheduled time, for example, when the electronic device network 105 incoming request load (volume) is predicted to be sufficiently reduced to permit facilitation and fulfillment of additional incoming access requests.

The adaptive access control 127 may briefly accept all incoming communications, (i.e., at least long enough to respond to the access request) and to communicate predetermined message(s), denial of service message(s), and schedule(s) to re-attempt access, to the electronic device and the end-user. The electronic device, for example mobile handset 107, may be adapted to display messages originating from the adaptive access control 127.

According to an embodiment of the present invention, incoming requests are not ignored or delayed indefinitely, but instead a graceful response may be sent. When the plurality of device servers are busy and incapable of fulfilling additional incoming requests, a graceful disconnection, or termination, occurs. A graceful disconnection, or termination, may comprise providing an end-user of an electronic device with an appropriate explanatory message(s), and/or by providing access rescheduling information to end-users, before communication with the electronic device is terminated.

In an embodiment according to the present invention, by communicating the explanatory message(s) and schedule(s) information, the end-user may be less frustrated or aggravated and better able to understand why the denial of service occurred and when the end-user request may be uneventfully processed.

In an embodiment according to the present invention, the adaptive access control 127 may queue a plurality of incoming requests that cannot be managed immediately by the plurality of device servers. The adaptive access control 127 may also provide to the electronic device making the request an appropriate message(s) indicating that the request has been received and queued, and a communication that the requested information/update will be delivered shortly, (i.e., in a certain period of time).

For example, the electronic device network 105 may be adapted to provide an "always connected" facility, wherein the electronic device network can "always be on" and wherein updates and requested information may be delivered in a "deferred mode" or "queued mode" if immediately not able to be processed and delivered.

The adaptive access control 127 may also provide queuing of incoming requests and forwarding of queued requests to an available one of the plurality of device servers. In an embodiment according to the present invention, the adaptive access control 127 may employ a messaging framework such as, for example, Java™ Messaging service (JMS) developed by Sun Microsystems, Inc., or MQSeries® messaging middleware developed by IBM Corporation, to queue incoming requests from the electronic devices upon determining that the incoming requests cannot be immediately fulfilled and may need to be deferred or rescheduled until one of the plurality of device servers are available.

FIG. 2 is a block diagram of an electronic device network 205 according to an embodiment of the present invention. FIG. 2 illustrates an electronic device network 205 adapted to gracefully deny service to a plurality of electronic devices, for example, mobile handset 207, communicatively coupled to one of a plurality of device servers, for example device servers 229 and 233, via a scheduler and load balancer 227. The device servers (229, 233) may be adapted to dispense requested updates to the plurality of electronic devices.

The electronic device network 205 may comprise a plurality of electronic devices, for example, mobile handset 207, adapted to download updates from the electronic device network 205. The plurality of device servers may receive requests for updates from the electronic devices and dispense the updates in response.

The electronic devices, for example mobile handset 207, may comprise both random access memory (RAM) 225 and non-volatile memory 266. The non-volatile memory 266 may comprise a plurality of components, such as update application loader (UA loader) 209, update agent 211, download agent 213, firmware 215, operating system (OS) 217, and applications 219. The update agent 211 may be a device or software application that is adapted to update the firmware 215, operating system 217, and/or applications 219, etc., in the electronic device, for example, mobile handset 207.

In an embodiment according to the present invention, the scheduler and load balancer 227 may gracefully manage denial of service for incoming requests that cannot be fulfilled, served, or processed immediately by the plurality of device servers, such as for example, device servers 229 and 233. The scheduler and load balancer 227 is adapted to monitor the load (e.g., service volume) on the device servers (229, 233) and determine if any of the device servers (229, 233) are available for fulfilling a current request for service.

The scheduler and load balancer 227 may also provide monitored information regarding the plurality of device servers to the adaptive access control 127, as illustrated in FIG. 1. Upon determining, by evaluating monitored information that none of the plurality of device servers are available to fulfill the current requests for service, the scheduler and load balancer 227 may predict an appropriate alternative schedule(s) for the electronic device to re-attempt an access request. The scheduler and load balancer 227 may directly communicate the alternative schedule(s) to the electronic device, or may direct the alternative schedule(s) to the adaptive access control 127 (as illustrated in FIG. 1 for example) for subsequent delivery to the electronic devices.

In an embodiment according to the present invention, the electronic devices, for example mobile handset 207, may store, retrieve, and act upon the alternative schedule(s) communicated from the scheduler and load balancer 227 or the adaptive access control 127, for example, by repeating the request for service/access based upon the alternative schedule (s). In an embodiment according to the present invention, the electronic devices may repeat the access requests without end-user intervention.

In an embodiment according to the present invention, the electronic devices may prompt an end-user to initiate rescheduled access requests. In an embodiment according to the present invention, the electronic device may display the alternative schedule(s) communicated from either the scheduler and load balancer 227 or the adaptive access control 127, and prompt the end-user to select and or confirm a particular alternative schedule(s), before autonomously repeating the request at a later time.

In an embodiment according to the present invention, the scheduler and load balancer 227 may determine, by monitoring and evaluating each of the incoming access requests, whether an incoming request is a rescheduled/repeated access request. Upon determining that an incoming request is a rescheduled/repeated request the scheduler and load balancer 227 may provide special service for the incoming request. Special service may comprise providing a rescheduled request with a higher priority of access to the requested update or other information.

The scheduler and load balancer 227 may provide graceful management of rescheduled/repeated incoming access requests by recognizing, (by monitoring and evaluating the incoming requests), that the request is a rescheduled/repeated request ,and by fulfilling and processing the rescheduled/repeated request with higher priority or urgency according to an embodiment of the present invention.

In an embodiment according to the present invention, the scheduler and load balancer 227 may provide graceful management of rescheduled/repeated incoming access requests by placing the incoming rescheduled/repeated request in a processing queue, moving the rescheduled/repeated request to an advanced position in the processing queue, and ensuring that the rescheduled/repeated request is directed for processing, urgently fulfilled, and not rescheduled again.

Figure 3:
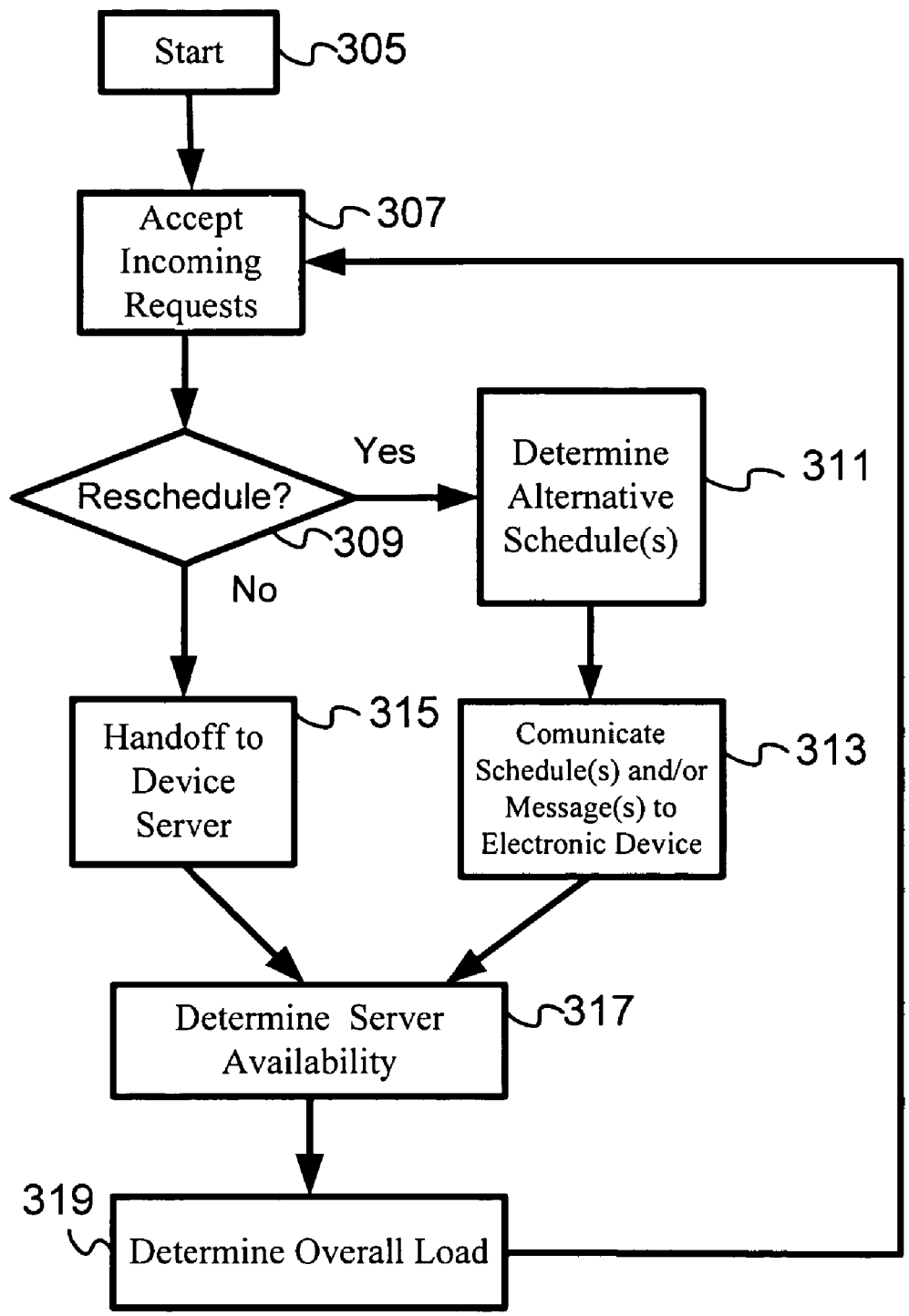
FIG. 3 is a flowchart illustrating a method of managing incoming access requests from an electronic device according to an embodiment of the present invention.

FIG. 3 is a flowchart illustrating a method of managing incoming access requests from an electronic device, such as, for example, mobile handsets 107 and 207 in FIGS. 1 and 2, for example, respectively, according to an embodiment of the present invention. Management of requests may begin (block 305) when the adaptive access control (for example, 127 in FIG. 1) establishes communication with at least one of the plurality of device servers in an electronic device network, such as, for example, electronic device networks 105 and 205 in FIGS. 1 and 2, for example, respectively. The adaptive access control 127 may then determine, from the monitoring taking place in the scheduler and load balancer 227, the availability of individual device servers, such as, for example, 129 and 133 in FIG. 1, and 229 and 233 in FIG. 2.

The adaptive access control 127 may commence accepting incoming requests (block 307). The adaptive access control 127 may then attempt to handoff an incoming request to one of the plurality of device servers for request processing. Upon determining, by evaluating the monitored information accessible from the scheduler and load balancer 227, that all of the device servers are busy, overloaded, or unavailable, the incoming access request may be rescheduled (block 309). An appropriate message(s) may then be communicated to the electronic device (block 313). Upon determining that one of the plurality of device servers is available to manage an incoming request, the request is handed over to the available device server for service/update delivery (block 315).

If it is determined (block 309) that all device servers are busy, overloaded, or unavailable, then based on expected load, statistical information collected, user profile, heuristics, and/or other criteria, alternative schedule(s) (block 311) for processing the incoming requests, may be determined by the scheduler and load balancer 227. The alternative schedule(s) and/or associated explanatory message(s) and schedule(s) may be communicated (block 313) to the electronic device before the existing communication connection between the electronic device and one of the adaptive access control 127 and the scheduler and load balancer 227 is terminated.

Communicating alternative schedule(s) along with a denial of service message provides graceful communication termination between the network and the electronic device by gracefully acknowledging the access request, providing potential alternate scheduling for satisfying the access request, and facilitating further interaction.

The adaptive access control 127 may determine, by evaluating the monitored information accessible from the scheduler and load balancer 227, which of the plurality of device servers are currently available (block 317). In an embodiment according to the present invention, the adaptive access control 127 may periodically contact the scheduler and load balancer 227, or the device servers, to determine the operational status of the plurality of device servers, and access monitored operation information.

By contacting the scheduler and load balancer 227, or the device servers, the adaptive access control 127 may retrieve operational status information comprising current load (request and fulfillment volume) information and available resource information regarding individual of the plurality of device servers. In an embodiment according to the present invention, the adaptive access control 127 may periodically retrieve a status communication directly from the device servers or from the scheduler and load balancer 227.

The adaptive access control 127 may determine, by evaluating the monitored information from the scheduler and load balancer 227, or from the device servers themselves, the overall load and current availability of the plurality of device servers to manage incoming service requests based upon the status, available resources, and load information retrieved from or available by evaluating the monitored information regarding the plurality of device servers (block 319). Thereafter, the adaptive access control 127 may continue accepting incoming requests (block 307), wherein the incoming requests may either be fulfilled or gracefully denied wherein denial may initiate communication of alternate schedule(s) and message(s) to the requesting electronic devices.

However, upon determining that an incoming request may be serviced (block 309) by one of the plurality of device servers, the adaptive access control 127 may select a candidate device server to process the incoming request based upon the load, operational status, resource availability, and/or other monitored information regarding the plurality of device servers. The adaptive access control 127 may handoff the incoming access request (block 315) for further processing and possible service/update information delivery by the selected candidate device server. The adaptive access control 127 may determine the availability (block 317) of individual of the plurality of device servers and determine the overall load (block 319), based on the load, status, availability, etc. of the individual device servers by evaluating the monitored information from the scheduler and load balancer 227 or from the device servers themselves.

Thereafter, the adaptive access control 127 may continue accepting incoming requests (block 307), wherein the incoming requests may either be fulfilled or gracefully denied wherein denial may initiate communication of alternate schedule(s) and message(s) to the requesting electronic devices.

Figure 4:
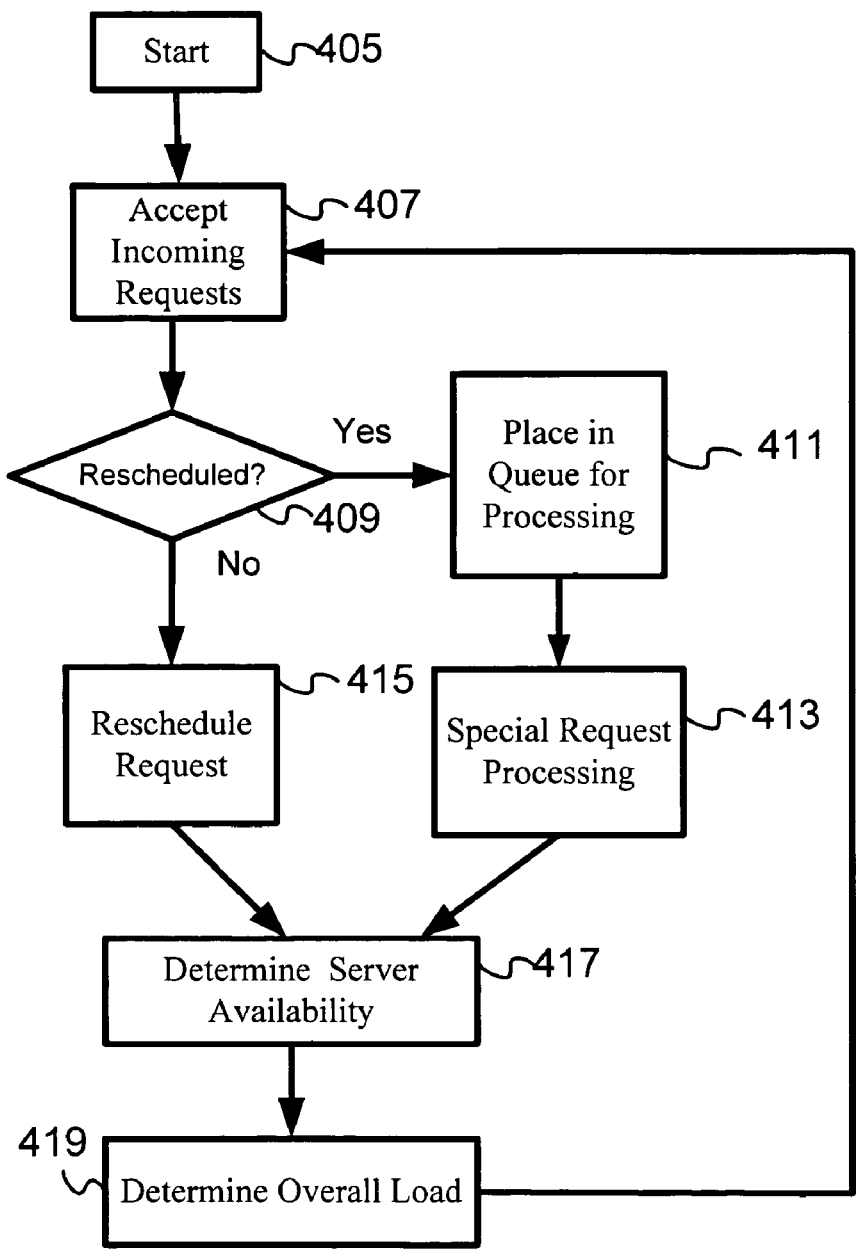
FIG. 4 is a flowchart illustrating a method of managing incoming access requests from an electronic device according to an embodiment of the present invention.

FIG. 4 is a flowchart illustrating a method of managing incoming access requests from an electronic device, such as, for example, mobile handsets 107 and 207 in FIGS. 1 and 2, for example, respectively, according to an embodiment of the present invention. FIG. 4 illustrates a method of providing priority service to incoming access requests determined to be rescheduled/repeated requests. Managing rescheduled/repeated requests provides graceful handling of requests that were previously denied, for example, because the server communication pathways were overwhelmed with requests, etc.

The adaptive access control 127 may commence accepting incoming requests (block 407). The scheduler and load balancer 227 may provide graceful management of rescheduled/repeated incoming access requests by recognizing (by monitoring the incoming requests) that an incoming request is a rescheduled/repeated request (block 409), and processing and fulfilling the rescheduled/repeated request with higher priority or urgency.

Upon determining that an incoming request is a rescheduled/repeated request, the rescheduled/repeated request may be placed in the processing queue for immediate processing (block 411). Depending upon the urgency of the request and the length of time that has passed since the first request, the request may receive special request processing (block 413). Special request processing may comprise advancing the request in the queue to facilitate more rapid request processing.

The adaptive access control 127 may then determine, by evaluating the monitored information accessible from the scheduler and load balancer 227, or from the device servers themselves, the overall load and current availability of the plurality of device servers to manage incoming service requests based upon the operational status, available resources, and load information retrieved from or available by evaluating the monitored information regarding the plurality of device servers (block 419). Thereafter, the adaptive access control 127 may be adapted to return to and/or continue accepting incoming requests (block 407).

Upon determining that one of the plurality of device servers is available to process an incoming request, by evaluating the monitored information from the scheduler and load balancer 227 or the device servers themselves, the incoming request may be handed over to the available device server for immediate processing, regardless of whether the incoming request is a first request or a repeated/rescheduled request.

Upon determining that an incoming request is a first request, i.e., the incoming request has not previously been rescheduled (block 409), the adaptive access control 127 may determine, based upon the load, operational status, resource availability, and/or other monitored information, whether the incoming request may be processed. If the device servers are unavailable to process the first request, the first request may be rescheduled (block 415) and the alternate schedule(s), denial of service message(s), explanatory message(s), may be transmitted to the electronic device.

The adaptive access control 127 may determine the availability (block 417) of each of the plurality of device servers and determine the overall load (block 419), based on the load, operational status, resource availability, etc. of the individual device servers; such information may be acquired by evaluating the monitored information accessible from the scheduler and load balancer 227, or accessible from the device servers themselves.

Thereafter, the adaptive access control 127 may continue accepting incoming requests (block 407), wherein the incoming requests may either be fulfilled or gracefully denied wherein denial may initiate communication of alternate schedule(s) and message(s) to the requesting electronic devices.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. A method of managing incoming access requests during an update event from a plurality of electronic devices in a communication network, each of the incoming access requests comprising at least one update-related parameter, the method comprising:
   receiving each incoming access request at least temporarily;
   monitoring and evaluating the incoming access requests using the at least one update-related parameter;
   determining the availability of at least one device server to process the incoming access requests, based upon the at least one update-related parameter;
   immediately processing incoming access requests upon determining that the at least one device server is available; and
   communicating at least one message to electronic devices requesting access upon determining that the at least one device server is unavailable.

2. The method according to claim 1, wherein communicating comprises determining at least one alternate schedule for the electronic device to send a rescheduled access request upon determining that the at least one device server is unavailable for processing, based upon the at least one update-related parameter.

3. The method according to claim 1, wherein the at least one update-related parameter comprises at least one of device identification information, firmware identification information, software identification information, and information regarding other resources available in the electronic device.

4. The method according to claim 1, wherein the at least one message comprises a denial of service message.

5. The method according to claim 4, wherein the denial of service message comprises at least one reason for service denial.

6. The method according to claim 1, wherein determining the availability of the at least one device server to process the incoming access requests comprises evaluating at least one of an expected volume of requests, collected statistical information, user profile, request profile, and heuristics.

7. The method according to claim 1, further comprising graceful communication termination, wherein graceful communication termination comprises communicating an alternate schedule to send a rescheduled access request along with an explanatory denial of service message.

8. The method according to claim 1, wherein monitoring and evaluating the incoming access requests further comprises periodically retrieving a status information communication from one of the at least one device server and at least one of the plurality of electronic devices.

9. The method according to claim 1, wherein monitoring and evaluating the incoming access requests further comprises monitoring at least one network resource, operational status of the at least one device server, a volume of incoming access requests, and information regarding at least one of the plurality of electronic devices.

10. The method according to claim 1, further comprising selecting a candidate device server to process an incoming access request based upon monitored information regarding the at least one device server.

11. The method according to claim 1, wherein the at least one electronic device comprises a plurality of mobile electronic devices, and wherein the plurality of mobile electronic devices comprise at least one of a mobile cellular phone handset, personal digital assistant, pager, MP3 player, and a digital camera.

12. The method according to claim 1, wherein the at least one message comprises alternate schedule information, wherein the alternate schedule information comprises at least one of a time to re-submit an access request, a particularly time frame for re-submitting an access request, an amount of time that must elapse before re-submitting and access request, and a particular date for re-submitting an access request.

13. A method of managing incoming access requests during an update event from a plurality of electronic devices in a mobile electronic network, the method comprising:
    evaluating the incoming access requests, the incoming access requests at least comprising at least one update-related parameter;
    recognizing that an incoming access request is a rescheduled access request; and
    fulfilling the rescheduled access request with higher priority than an original request.

14. The method according to claim 13, wherein the rescheduled access request is an incoming access request that was previously denied.

15. The method according to claim 13, wherein fulfilling the rescheduled access request with higher priority than an original request comprises advancing the rescheduled request in a processing queue.

16. The method according to claim 13, wherein fulfilling the rescheduled access request with higher priority than an original request comprises immediately placing the rescheduled request in the processing queue.

17. The method according to claim 13, wherein the at least one mobile electronic device comprises a plurality of electronic devices, and wherein the plurality of electronic devices comprise at least one of a mobile cellular phone handset, personal digital assistant, pager, MP3 player, and a digital camera.

18. The method according to claim 13, wherein the at least one update-related parameter comprises at least one of device identification information, firmware identification information, software identification information, and information regarding other resources available in the electronic device.

19. An electronic device network adapted to manage incoming access requests during an update event, each of the incoming access requests comprising at least one update-related parameter, the electronic device network comprising:
    at least one mobile electronic device having one of software and firmware, the mobile electronic device being adapted to be communicatively coupled to the electronic device network;
    an access control unit;
    at least one device server operatively coupled to the access control unit; and
    a memory operatively coupled to the at least one device server, wherein the access control unit is adapted to immediately process and manage incoming information access requests from the at least one electronic device, and wherein the access control unit is adapted to determine an incoming access request volume at the at least one device server and ability of the at least one device server to service additional incoming access requests.

20. The electronic device network according to claim 19, wherein the at least one mobile electronic device comprises a plurality of electronic devices, and wherein the plurality of electronic devices comprise at least one of a mobile cellular phone handset, personal digital assistant, pager, MP3 player, and a digital camera.

21. The electronic device network according to claim 19, wherein the at least one device server comprises a plurality of device servers adapted to dispense updates to a plurality of update requesting electronic devices.

22. The electronic device network according to claim 19, further comprising a monitoring unit adapted to monitor activity of the at least one device server.

23. The electronic device network according to claim 19, wherein the memory further comprises a plurality of updates retrievable by the at least one device server.

24. The electronic device network according to claim 19, wherein the at least one mobile electronic device comprises random access memory and non-volatile memory, and wherein the non-volatile memory comprises at least one of an update application loader, update agent, download agent, and an operating system.

25. The electronic device network according to claim 19, wherein an incoming access request comprises at least one of device identification information, firmware identification information, software version information, and resource availability information.

26. The electronic device network according to claim 19, wherein the access control unit is adapted to determine priority of an incoming access request by recognizing that the incoming access request is one of a repeated and rescheduled access request.

27. The electronic device network according to claim 19, wherein the access control unit is adapted to determine one of whether a particular incoming access request requires immediate processing, whether the incoming access request requires deferment, and whether the incoming access request requires denial based upon operational status information gathered by monitoring the at least one device server and by evaluating the incoming access request.

28. The electronic device network according to claim 27, wherein upon determining that the incoming access request requires denial, the access control unit communicates at least one message to the mobile electronic device.

29. The electronic device network according to claim 28, wherein the at least one message to the mobile electronic device comprises a denial of service message.

30. The electronic device network according to claim 28, wherein the at least one message to the mobile electronic device comprises at least one reason for service denial.

31. The electronic device network according to claim 28, wherein upon determining that the incoming access request requires denial, the access control unit is adapted to determine at least one alternate schedule for the mobile electronic device to send a rescheduled access request.

32. The electronic device network according to claim 28, wherein upon determining that the incoming access request requires denial, the access control unit is adapted to communicate at least one alternate schedule to the mobile electronic device along with the at least one message.

33. The electronic device network according to claim 28, wherein a rescheduled access request is an incoming access request that was previously denied service, the rescheduled access request is determined to have higher priority than an original incoming access request, and wherein the rescheduled access request is one of immediately placed in the processing queue and advanced in the processing queue.

34. The electronic device network according to claim 28, wherein a rescheduled request is rapidly advanced in the processing queue.

35. The electronic device network according to claim 27, wherein upon determining that the incoming access request requires denial, a denial of service message is displayed at the mobile electronic device.

36. The electronic device network according to claim 27, wherein upon determining that the incoming access request requires denial, a message comprising instructions for re-attempting the denied access request at one of a specific time and after a period of time has elapsed and an explanatory message is displayed at the mobile electronic device.

37. The electronic device network according to claim 26, wherein the access control unit is adapted to at least briefly accept all incoming communications.

38. The electronic device network according to claim 19, further comprising a monitoring unit, the monitoring unit being adapted to gracefully manage denial of service for incoming access requests by:
  monitoring a volume of incoming access requests;
  determining device server availability;
  providing monitored information to the access control unit;
  determining alternative schedules for mobile electronic devices to re-attempt access requests; and
  communicating the alternative schedules to the mobile electronic devices.

39. The electronic device network according to claim 19, wherein the mobile electronic devices are adapted to one of:
  repeat denied access requests without end-user intervention;
  prompt an end-user to initiate repeated access requests;
  display alternative schedules communicated to the mobile electronic device;
  prompt the end-user to select a particular alternative schedule; and
  autonomously repeat the access request according to a selected alternative schedule.

40. The electronic device network according to claim 19, wherein the at least one update-related parameter comprises at least one of device identification information, firmware identification information, software identification information, and information regarding other resources available in the electronic device.

41. A method of managing incoming access requests during an update event from a plurality of electronic devices in a communication network, each of the incoming access requests comprising at least one selection-related parameter, the method comprising:
  receiving each incoming access request at least temporarily;
  monitoring and evaluating the incoming access requests using the at least one selection-related parameter;
  determining whether the incoming access requests are able to be processed based upon the at least one selection-related parameter;
  immediately processing incoming access requests upon determining that processing the incoming access request is likely to be successful; and
  communicating at least one message to the electronic device requesting access upon determining that processing the incoming access request is unlikely to be successful.

42. The method according to claim 41, wherein the at least one message communicated to electronic device comprises schedule information useable by the electronic device to re-attempt access employing another incoming access request.

43. The method according to claim 41, wherein the at least one message communicated to electronic device comprises a schedule information indicating a time when the communication network is likely to be able to provide one of requested information and data to the electronic device.

* * * * *